UNITED STATES PATENT OFFICE.

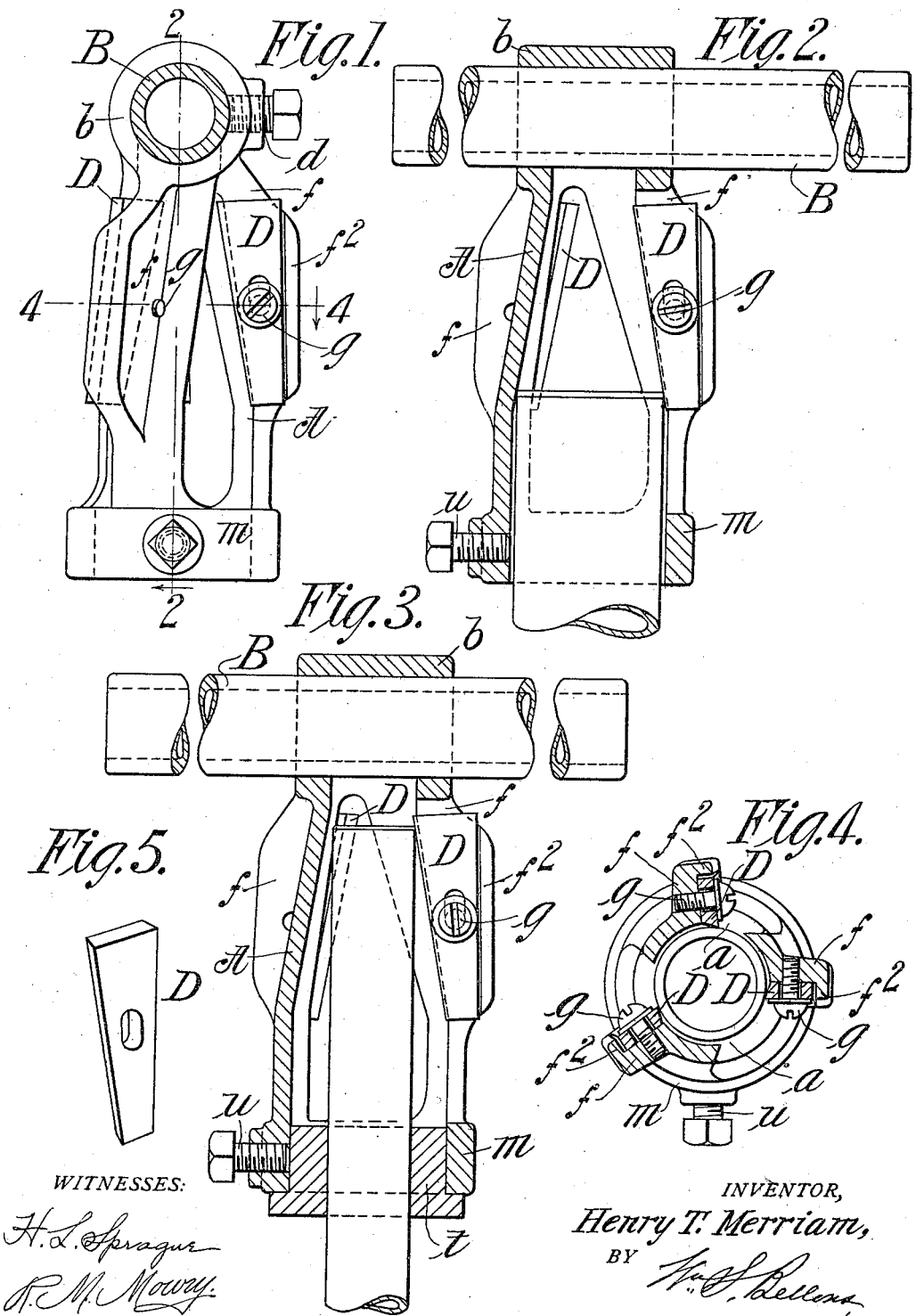

HENRY T. MERRIAM, OF SPRINGFIELD, MASSACHUSETTS.

BUR-REMOVER FOR PIPES.

1,036,298.

Specification of Letters Patent. Patented Aug. 20, 1912.

Application filed March 13, 1911. Serial No. 613,997.

*To all whom it may concern:*

Be it known that I, HENRY T. MERRIAM, a citizen of the United States of America, and resident of Springfield, in the county of Hampden and State of Massachusetts, have invented certain new and useful Improvements in Bur-Removers for Pipes, of which the following is a full, clear, and exact description.

This invention relates to a tool or implement for the removal of bur from the end of pipes, such as iron, steam and gas pipes, which have been sawed to the proper length, and whereby the ends of the pipes will be in proper condition to be screw threaded, or advantageously adapted for use in some cases where they are not to have screw threads thereon.

The invention in conjunction with the objects and advantages thereof is described in connection with the accompanying drawings and is set forth in the claims.

In the drawings:—Figure 1 is a side view of the tool; Fig. 2 is a central vertical sectional view on line 2—2, Fig. 1; Fig. 3 being a similar sectional view but showing the detachably connected diameter reducing collet in the lower portion of the tool. Fig. 4 is a horizontal section on line 4—4, Fig. 1, and Fig. 5 is a perspective view of one of the shearing blades or cutters.

In the drawings, A represents a body which may be made of metal, the intermediate portion of which is of upwardly convergent form; and it is made with apertures $a$, here three in number, which by reason of their considerable width render the body of the tool in the form of a skeleton frame.

The body has at its upper end a transverse axially horizontal tubular head $b$ through which a handle bar B may be fitted and secured by the set screw $d$, the opposite extremities of such bar serving in the manner of wrench handles.

The body is made with a plurality of integrally formed outwardly extending flanges $f$ $f$, which have their faces in planes angular to planes which are truly radial to the axis of the tool; and said flanges have angularly extended ribs $f^2$ at their outer portions to give reinforcing backings to the blades D which are, by the binding screws $g$, secured facewise on the flanges $f$, and in planes corresponding thereto, and have their working inner edges extended, in convergent relations, within the said apertures.

By the location and arrangement of the blades as described, they operate with an effective shearing cut on the end of the pipe, as will be easily understood on reference to Fig. 2.

In practice it is considered best to employ three of the blades and the mountings therefor; and, as will be noticed on reference to Fig. 4, while the blades are set approximately at "thirds", they are not strictly so, as the spaces between every two of the blades are unequal; and by this arrangement of inequality in the spacing of the blades the latter in operation upon the end of a pipe will take a proper "lead" and operate with an entire avoidance of chattering so that an entirely smoothly finished end of the pipe may be produced.

The lower extremity of the body is shown as made with a downwardly open circularly continuous cylindrical portion $m$; and in conjunction with these tools interchangeable diameter reducing collets $t$ as shown in Fig. 3, are to be provided, one of these collets being detachably held in its place by the set screw $u$.

A collet of suitable size may be used, as occasion therefor requires, to form a centering portion of the bur removing tool, adaptable to reduced sizes of pipes.

I claim:—

1. In a bur removing tool for pipes, a body comprising upwardly convergent portions made with apertures therein, and having a plurality of outwardly extending flanges located along the sides of the body at the margins of the apertures, having their faces in planes angular to planes which are truly radial to the axis of the tool, and said flanges having angularly extended ribs at their outer portions, and cutter blades secured facewise on said flanges with their outer edges against said ribs, and having their working inner edges extended in convergent relations within said apertures.

2. In a bur removing tool for pipes, a hollow body comprising upwardly convergent portions made with apertures therein, and a downwardly opening, continuous cylindrical lower portion, and having means whereby said body may be rotated to work on a pipe, a plurality of cutter blades located along the sides of the body in suitably angular shearing planes, having their working inner edges extended in convergent relations to each other, within said aperture, and a diameter reducing collet removably fitted in the cylindrical lower portion of the body and having means for its detachable confinement therein.

Signed by me at Springfield, Mass., in presence of two subscribing witnesses.

HENRY T. MERRIAM.

Witnesses:
G. R. DRISCOLL,
W. S. BELLOWS.

Copies of this patent may be obtained for five cents each, by addressing the "Commissioner of Patents, Washington, D. C."